United States Patent
Cercone et al.

(10) Patent No.: US 10,293,550 B2
(45) Date of Patent: May 21, 2019

(54) PROCESS AND MACHINE FOR REINFORCING A THERMOPLASTIC PIPE

(71) Applicant: Milliken Infrastructure Solutions, LLC, Spartanburg, SC (US)

(72) Inventors: Lawrence Cercone, Littleton, CO (US); Daniel J. Bomar, Sr., Littleton, CO (US)

(73) Assignee: Milliken & Company, Spartanburg, SC (US)

(*) Notice: Subject to any disclaimer, the term of this patent is extended or adjusted under 35 U.S.C. 154(b) by 482 days.

(21) Appl. No.: 14/881,618

(22) Filed: Oct. 13, 2015

(65) Prior Publication Data

US 2017/0100880 A1 Apr. 13, 2017

(51) Int. Cl.
| | |
|---|---|
| F16L 55/168 | (2006.01) |
| B29C 65/14 | (2006.01) |
| B29C 65/02 | (2006.01) |
| B29C 65/48 | (2006.01) |
| F16L 9/12 | (2006.01) |

(Continued)

(52) U.S. Cl.
CPC ............. B29C 65/14 (2013.01); B29C 35/02 (2013.01); B29C 65/02 (2013.01); B29C 65/48 (2013.01); F16L 9/12 (2013.01); F16L 55/168 (2013.01); F16L 55/1683 (2013.01); F16L 55/1686 (2013.01); F16L 55/18 (2013.01); B29L 2023/22 (2013.01)

(58) Field of Classification Search
CPC .............................. F16L 9/12; B29L 2023/22
USPC ...................................................... 156/184
See application file for complete search history.

(56) References Cited

U.S. PATENT DOCUMENTS

| | | | | |
|---|---|---|---|---|
| 3,966,528 A | * | 6/1976 | Christie | ............ B29C 66/52241 156/293 |
| 4,005,968 A | * | 2/1977 | Crawford | .............. B29B 13/025 264/318 |

(Continued)

FOREIGN PATENT DOCUMENTS

| | | |
|---|---|---|
| CA | 2092690 | 10/2000 |
| GB | 2 310 907 | 9/1997 |
| GB | 2 343 728 | 5/2000 |

OTHER PUBLICATIONS

Patent Cooperation Treaty PCT International Search Report. dated Aug. 17, 2016. International Application No. PCT/US2016/035673. International Filing Date: Jun. 3, 2015.

*Primary Examiner* — Michael N Orlando
*Assistant Examiner* — Christian Roldan
(74) *Attorney, Agent, or Firm* — Cheryl J. Brickey

(57) ABSTRACT

A process of reinforcing a thermoplastic pipe containing locating a thermoplastic pipe containing at least one defect on the outer surface extending at least partially into the pipe wall thickness. A tie-layer film is wrapped approximately one full rotation around the circumference of the pipe and energy is applied to the film, adhering the film to the outer surface of the pipe. An uncured reinforcing material containing a textile at least partially embedded into an uncured matrix is wrapped on the outer surface of the pipe at least one full rotation about the circumference of the pipe completely overlaying the defect. A machine is attached for reinforcing a thermoplastic pipe onto the thermoplastic pipe and energy is applied to cure the uncured matrix forming a cured reinforcing material. A machine for delivering the energy is also disclosed.

9 Claims, 2 Drawing Sheets

(51) Int. Cl.
  *B29C 35/02* (2006.01)
  *F16L 55/18* (2006.01)
  *B29L 23/00* (2006.01)

(56) References Cited

U.S. PATENT DOCUMENTS

| | | | |
|---|---|---|---|
| 4,263,084 A * | 4/1981 | Takala | B29C 65/20 |
| | | | 156/158 |
| 2010/0000621 A1 | 1/2010 | Kamata et al. | 138/99 |
| 2011/0203694 A1 | 8/2011 | Brooks | 138/99 |
| 2013/0221569 A1 | 8/2013 | Probst et al. | 264/259 |
| 2014/0305573 A1* | 10/2014 | Cittadini Bellini | ........... |
| | | | B29C 63/0069 |
| | | | 156/86 |

* cited by examiner

PROCESS AND MACHINE FOR REINFORCING A THERMOPLASTIC PIPE

TECHNICAL FIELD

This invention relates generally to processes and machine for reinforcing a thermoplastic pipe.

BACKGROUND

Thermoplastic pipes are typically used to deliver or convey an assortment of media that may have corrosive chemical properties. For example, polyethylene pipes are commonly used by gas utility companies. Such pipes themselves may be deployed in environments that also subject the exterior of the pipe to corrosive or otherwise physically or chemically damaging conditions causing defects such as gouges, cracks, and joint connections that degrade. There is a need to have a process and a machine that will allow for the reinforcement and fixing of thermoplastic pipe without taking the pipe out of commission.

SUMMARY

The application is directed towards a process of reinforcing a thermoplastic pipe. A thermoplastic pipe is located having a length, a circumference, an outer surface, and a pipe wall thickness and has least one defect on the outer surface extending at least partially into the pipe wall thickness. A tie-layer film is wrapped approximately one full rotation around the circumference of the pipe. The film completely overlays the defect, contains a first polyethylene layer and a second polyurethane layer, and the tie-layer film is oriented such that the first layer is adjacent the pipe. Energy is applied to the film, adhering the film to the outer surface of the pipe. An uncured reinforcing material is wrapped on the outer surface of the pipe at least one full rotation about the circumference of the pipe completely overlaying the defect. The uncured reinforcing material contains a textile at least partially embedded into an uncured matrix. A machine for reinforcing a thermoplastic pipe is attached onto the thermoplastic pipe. The machine comprises a track system and an energy delivery system. Energy is applied to cure the uncured matrix forming a cured reinforcing material.

The application is also directed towards a machine for reinforcing a thermoplastic pipe. The thermoplastic pipe has an outer surface and a length and at least one defect on the outer surface. The machine contains a pair of clamps adapted to attach to a thermoplastic pipe along the thermoplastic pipe length and a pair of extenders having a first end and a second end, where the first end is connected to the clamp and the extenders extend away from the thermoplastic pipe, and where the extenders are parallel to each other. The machine also contains a track system extending between the second ends of the extenders, where the track system comprises at least one generally linear member and an energy delivery system. The curing delivery system comprises a track end attached to the track system, a cure head comprising a circular attachment adapted to extend around the entire circumference of a portion of the length of the pipe, and a mid-section connecting the track end and the cure head. The energy delivery system is moveable along the length of the pipe on the track system.

BRIEF DESCRIPTION OF THE DRAWINGS

The present invention will now be described by way of example only, with reference to the accompanying drawings which constitute a part of the specification herein and in which.

DETAILED DESCRIPTION

At present, when a repair of a damaged pipe needs to be untaken, the polyethylene pipe is typically "squeezed off" (compressing the pipe between smooth steel bars until all gas flow stops). Once the flow has stopped a section of the pipe is cut out. A device is then used to melt a fuse a new section of pipe, replacing the section that has been removed. This current industry standard repair method requires the gas to be turned off. One advantage to the invention machine and method described below is that it allows the repair to be made while natural gas is still flowing through the pipe. While "squeezing off" has proven a suitable method in stopping the gas flow the act of "squeezing off" it is believed introduces micro cracking at the "squeeze off" site potentially introducing a future failure site in the pipe.

Figure 1:
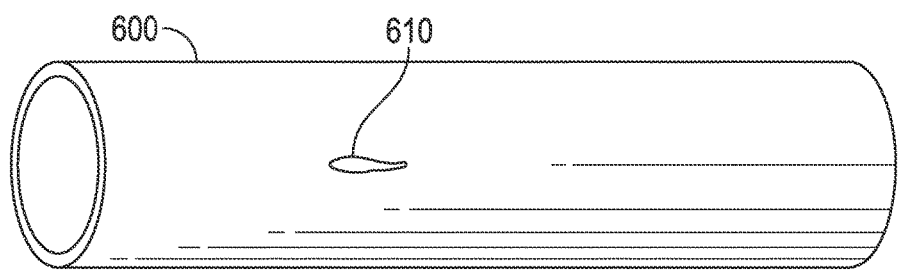
FIGS. 1-4 are illustrations of the process to reinforce a thermoplastic pipe at different stages in the process.

One embodiment of the process to reinforce a thermoplastic pipe is described in FIGS. 1-4. Preferably, there is material (in the form of a gas, liquid, or solid) that continuously travels within the pipe throughout the repair and reinforcing process. Referring to FIG. 1, the process begins with a pipe 600 which may be any suitable pipe, preferably a thermoplastic pipe. Pipes are also sometimes referred to as conduits or tubes. The pipe 600 has an inner diameter, an outer diameter, and a wall thickness (defined as the outer diameter minus the inner diameter divided by two). The pipe also has a circumference, an outer surface and a length.

The pipe may be formed from any suitable materials, preferably a thermoplastic polymer. Some thermoplastics include, but are not limited to thermoplastic polyolefins (polyethylene (PE), polypropylene (PP), polymethylpentene (PMP), polybutene-1 (PB-1)); polyisobutylene (PIB), ethylene propylene rubber (EPR), ethylene propylene diene monomer (M-class), poly vinyl chloride (PVC), Acrylonitrile butadiene styrene (ABS), rubber (EPDM rubber), and mixtures thereof. Preferably, the pipe comprises polyethylene which is a preferred material to use in gas transmission and other types of pipe lines. In one embodiment, the polyethylene of the pipe is a medium density polyethylene.

The pipe 600 contains at least one defect 610 on the outer surface of the pipe extending at least partially into the pipe wall thickness. Any concave deviation from a smooth outer surface may be considered a defect 610. In one embodiment, the defect 610 extends only partially through the wall thickness of the pipe 600 and in another embodiment, the defect extends completely through the wall thickness of the pipe 600. The defect may be, but is not limited to a gouge, holes, pinholes, cracks, microcracks, butt splices. Preferably, the defect has a depth of at least about 10% of the pipe wall thickness. In another embodiment, the defect has a depth of at least about 20%, 30%, or 50% of the pipe wall thickness. In another embodiment, the defect has a depth of the entire pipe wall thickness.

In one embodiment, the defect is from a splice connecting two pipes. When deploying polyolefin pipe in a particular application, it is frequently necessary to join two sections of pipe together end-to-end. One method of accomplishing this is by welding the pipe sections together. In a common technique known as butt fusion, the two pipe sections are heated by a welding plate in the form of a heated disk to cause the ends of the pipes to become molten. The welding plate is then removed and the pipe sections are pressed together with some predetermined force for some predetermined duration of time, depending upon wall thickness and pipe diameter. The result is a weld joint that typically has a circumferential bead cap. There are known potential problems with such weld joints, due to stress differentials and the like that may exist in the heat-affected zone. Weld joints are susceptible to cracking over time, either due to external forces, such as soil movement or physical impact, or due to the material becoming brittle over time. The splice itself or the partial or full failure of a splice may be considered a defect.

There are also various types of field connections that may be made to polyolefin pipe. These include couplings such as tees, elbows, reducers, and so on. Field connections typically employ some form of crimping force to squeeze the joints together. This crimping process is known to introduce micro-cracks in the pipe material. These micro-cracks can grow over time, due to cyclic pressures, exposure to temperature swings, material embrittlement, and so on, leading to failure or leaks. The micro-cracks may be considered to be defects.

Once the pipe 600 and the defect 610 are located and uncovered (if covered in insulation or buried in the ground), the outer surface of the pipe 600 and the defect 610 may optionally be cleaned. This serves to prepare the outer surface and the defect for the next steps and ensure good adhesion between the pipe 600 and the additional layers to be added. The pipe 600 may be cleaned with any suitable cleaner including water, methanol, isopropyl alcohol, and methyl ethyl ketone (MEK).

Figure 2:
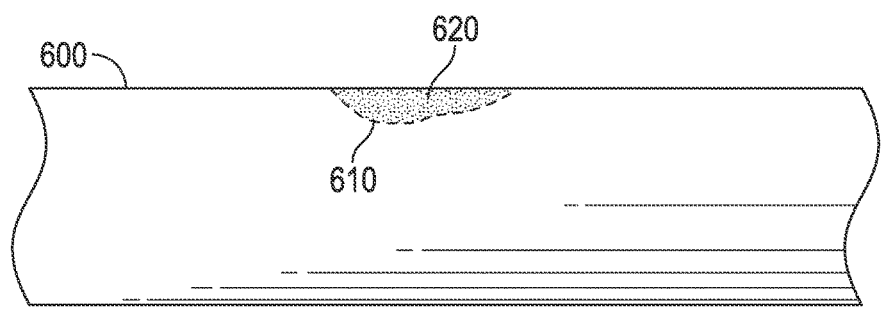

Optionally, the defect is filled with a filler material 620 as shown in FIG. 2. The filler may be any suitable filler material including, but not limited to, polyester, epoxy, vinyl ester, polyurethane, thermoplastic material, rubber compound, or acrylic, such as a methyl acrylate or thermoplastic material. After the filler material has been applied and cured or otherwise hardened, then optionally the filler material is then optionally sanded or otherwise removed so that the surface of the filled defect is approximately equal to the outer surface of the pipe 600. The pipe 600 may be optionally cleaned again after the filler is applied and/or sanded.

Figure 3:
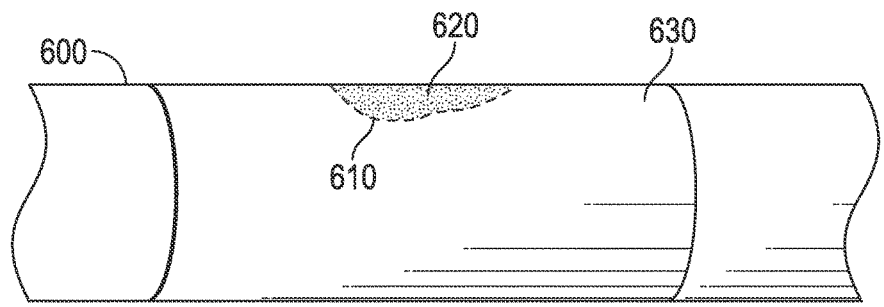

Next, as shown in FIG. 3, a tie-layer film 630 is wrapped around the pipe 600 completely overlaying the defect 610 approximately one full rotation. Preferably, the tie-layer film 630 overlays the defect and at least 2 inches of the pipe on either side of the defect along the length and circumferential directions in the pipe 600.

The tie-layer film 630 contains a first layer and a second layer where the film 630 is oriented such that the first layer of the film 630 faces and is adjacent to the pipe 600 and the second layer of the film 630 faces away from the pipe 630. The first layer preferably is able to form a good bond with the outer surface of the pipe 600 and the second layer preferably is able to form a good bond with subsequently applied materials. In one embodiment, the first layer comprises the same thermoplastic as the thermoplastic of the pipe 600. In another embodiment, the first layer of the tie-layer film comprises polyethylene. In one embodiment, the second layer comprises a thermoplastic known to have good bonding to the planned next layers. In another embodiment, the second layer of the tie-layer film comprises urethane. In a preferred embodiment, the tie-layer film 630 is two layer film containing a polyethylene first layer and a polyurethane second layer such as a film available from NOLAX™.

The tie-layer film 630 may be formed by any suitable process including blown extrusion and multi-layer film extrusion. Preferably, the tie-layer film 630 is applied to the pipe 600 such that the film 630 makes approximately one full rotation around the pipe 600. If the film is wrapped more than approximately once, there may be an increased chance of lamination issues where the first side and the second side of the film would be adjacent and may not have as good a bond. Preferably, the tie-layer film is applied such that the defect (in the length direction of the pipe) is completely covered, more preferably the film 630 extends at least 1" on either side of the defect along the length direction of the pipe, more preferably the film 630 extends at least 2" on either side of the defect.

In order to keep the tie-layer film 630 in place on the pipe before heat is applied and the film 630 adheres to the outer surface of the pipe 600, optionally an adhesive is used on the edges of the film 630 to hold the film 630 in place at least temporarily. Preferable, a high temperature pressure sensitive adhesive tape is used to hold down the film 630 before and during the step of applying heat to the film 630. This adhesive, preferably the high temperature pressure sensitive adhesive, may be left on the pipe or removed after the film 630 is adhered to the outer surface of the pipe 600 (or during any step after).

Energy is applied to the film 630 to adhere the film (through its first layer) to the outer surface of the pipe 600. This may also be referred to a fusing the film 630 onto the pipe 600. Energy may be applied by any suitable energy delivery system. The energy delivered is preferable heat, but may also be UV light or any other energy that causes the film 630 to adhere to the pipe 600. In a preferred embodiment, the energy is delivered as heat. The heat may be supplied in any suitable form, preferably hot or heated air such as from a hot air blower. Preferably, the heat is applied until the pipe surface reaches a temperature of at least about 200° F., more preferably at least about 250° F., more preferably at least about 300° F. Once the heat source is removed from the film (or turned off), the film 630 cools and is adhered to the pipe 600. In one embodiment, the machine 10 (not shown) may be used to deliver the energy.

Figure 4:
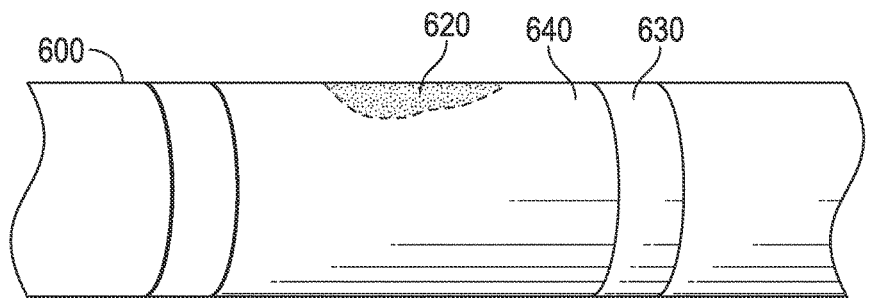

Next, shown in FIG. 4, an uncured reinforcing material 640 is wrapped on the outer surface of the pipe 600 at least approximately one full rotation about the circumference of the pipe 600 on top of and in contact with the tie-layer film 630 and covering the defect 610. Preferably, the uncured reinforcing material 640 is wrapped on the outer surface of the pipe 600 in a hoop fashion around the circumference of the pipe 600. For longer (along the length direction of the pipe 600) repair areas, the material 640 can be wrapped in a spiral fashion around the circumference of the pipe 600. In this case the wrap material is typically overlapped 50% of the reinforcing fabric width, but can be overlapped more or less depending on the nature of the repair. In normal repair situations 6 layers of reinforcing material 640 are applied, but, based on detailed engineering calculation of the pipe condition, this can vary from 1 layer to 2 layers as a minimum to a maximum determined by these calculations.

The uncured reinforcing material 640 contains fibers at least partially embedded into an uncured matrix. "Fiber" used herein is defined as an elongated body and includes yarns, tape elements, and the like. The fiber may have any suitable cross-section such as circular, multi-lobal, square or rectangular (tape), and oval. The fibers may be monofilament or multifilament, staple or continuous, or a mixture thereof. Preferably, the fibers have a circular cross-section. Preferably, the fibers are fully embedded into the uncured matrix. The uncured reinforcing material is sometimes referred to as an uncured fiber reinforcing material.

The fibers 110 can be formed from any type of fiberizable material known to those skilled in the art including fiberizable inorganic materials, fiberizable organic materials and mixtures of any of the foregoing. The inorganic and organic materials can be either man-made or naturally occurring materials. One skilled in the art will appreciate that the fiberizable inorganic and organic materials can also be polymeric materials. As used herein, the term "polymeric material" means a material formed from macromolecules composed of long chains of atoms that are linked together and that can become entangled in solution or in the solid state. As used herein, the term "fiberizable" means a material capable of being formed into a generally continuous or staple filament, fiber, strand or yarn. In one embodiment, the fibers 110 are selected from the group consisting of carbon, glass, aramid, boron, polyalkylene, quartz, polybenzimidazole, polyetheretherketone, basalt, polyphenylene sulfide, poly p-phenylene benzobisoaxazole, silicon carbide, phenolformaldehyde, phthalate and napthenoate, polyethylene. In another embodiment, the fibers are metal fibers such as steel, aluminum, or copper.

Preferably, the fibers 110 are formed from an inorganic, fiberizable glass material. Fiberizable glass materials useful in the present invention include but are not limited to those prepared from fiberizable glass compositions such as S glass, S2 glass, E glass, R glass, H glass, A glass, AR glass, C glass, D glass, ECR glass, glass filament, staple glass, T glass and zirconium oxide glass, and E-glass derivatives. As used herein, "E-glass derivatives" means glass compositions that include minor amounts of fluorine and/or boron and most preferably are fluorine-free and/or boron-free. Furthermore, as used herein, "minor amounts of fluorine" means less than 0.5 weight percent fluorine, preferably less than 0.1 weight percent fluorine, and "minor amounts of boron" means less than 5 weight percent boron, preferably less than 2 weight percent boron. Basalt and mineral wool are examples of other fiberizable glass materials useful in the present invention. Preferred glass fibers are formed from E-glass or E-glass derivatives.

The glass fibers of the present invention can be formed in any suitable method known in the art, for forming glass fibers. For example, glass fibers can be formed in a direct-melt fiber forming operation or in an indirect, or marble-melt, fiber forming operation. In a direct-melt fiber forming operation, raw materials are combined, melted and homogenized in a glass melting furnace. The molten glass moves from the furnace to a forehearth and into fiber forming apparatuses where the molten glass is attenuated into continuous glass fibers. In a marble-melt glass forming operation, pieces or marbles of glass having the final desired glass composition are preformed and fed into a bushing where they are melted and attenuated into continuous glass fibers. If a pre-melter is used, the marbles are fed first into the pre-melter, melted, and then the melted glass is fed into a fiber forming apparatus where the glass is attenuated to form continuous fibers. In the present invention, the glass fibers are preferably formed by the direct-melt fiber forming operation.

In one embodiment, when the fibers 110 are glass fibers, the fibers contain a sizing. This sizing may help processability of the glass fibers into textile layers and also helps to enhance fiber-polymer matrix interaction. In another embodiment, the fibers 110 being glass fibers do not contain a sizing. The non-sizing surface may help to simplify the coating process and give better control of particle-fiber interaction and particle agglomeration. Fiberglass fibers typically have diameters in the range of between about 10-35 microns and more typically 17-19 microns. Carbon fibers typically have diameters in the range of between about 5-10 microns and typically 7 microns, the fibers (fiberglass and carbon) are not limited to these ranges.

Non-limiting examples of suitable non-glass fiberizable inorganic materials include ceramic materials such as silicon carbide, carbon, graphite, mullite, basalt, aluminum oxide and piezoelectric ceramic materials. Non-limiting examples of suitable fiberizable organic materials include cotton, cellulose, natural rubber, flax, ramie, hemp, sisal and wool. Non-limiting examples of suitable fiberizable organic polymeric materials include those formed from polyamides (such as nylon and aramids), thermoplastic polyesters (such as polyethylene terephthalate and polybutylene terephthalate), acrylics (such as polyacrylonitriles), polyolefins, polyurethanes and vinyl polymers (such as polyvinyl alcohol).

In one embodiment, the fibers 110 preferably have a high strength to weight ratio. Preferably, the fibers 110 have strength to weight ratio of at least 0.7 $GPa/g/cm^3$ as measured by standard fiber properties at 23° C. and a modulus of at least 69 GPa. In one preferred embodiment, the fibers are fiberglass fibers. In another embodiment, the fibers are carbon fibers. In another embodiment, the fibers are aramid fibers.

The uncured matrix material may contain any suitable uncured material including but not limited to uncured polyurethane, uncured epoxy, and mixtures thereof.

In one embodiment, the fibers in the uncured reinforcing material 640 are in a textile including but not limited to a woven textile, non-woven textile (such as a chopped strand mat), bonded textile, knit textile, a unidirectional textile, and a sheet of strands. In the case of woven, knit, warp knit/weft insertion, non-woven, or bonded the textile can have fibers that are disposed in a multi-(bi- or tri- or quadri-) axial direction. In one embodiment, the textile is a woven textile, for example, plain, satin, twill, basket-weave, poplin, jacquard, and crepe weave textiles. A plain weave textile has been shown to have good abrasion and wear characteristics. A twill weave has been shown to have good properties for compound curves.

In another embodiment, the textile is a knit textile, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face. In another embodiment, the textile is a multi-axial textile, such as a tri-axial textile (knit, woven, or non-woven). In another embodiment, the textile is a non-woven textile. The term non-woven refers to structures incorporating a mass of fibers that are entangled and/or heat fused so as to provide a structure with a degree of internal coherency. Non-woven textiles may be formed from many processes such as for example, meltspun processes, hydroentangeling processes, mechanically entangled processes, stitch-bonded, wet-laid, and the like. In another preferred embodiment, the textile is a unidirectional textile and may have overlapping fiber bundles or may have gaps between the fiber bundles.

In one preferred embodiment, textile comprises between about 50 and 90% by number fibers in a warp direction and between about 10 and 50% by number fibers in the weft direction, perpendicular to the warp direction. This construction has been shown to provide a textile having good reinforcing properties.

Next, optionally a constrictor wrapping 650 is wrapped around the circumference of the pipe, covering the uncured reinforcing material. The constrictor wrapping is preferably a stretch polyolefin film treated with a release agent that applies hoop pressure to the reinforcing material 640 while it cures insuring intimate contact between adjacent layers of reinforcing materials and the pipe. In some cases this film is perforated to allow reaction gasses to escape during cure. In one embodiment the constrictor wrapping at least partially covers the uncured matrix material 640. In a preferred embodiment, the constrictor wrapping fully covers the uncured matrix material 640 and helps hold the shape of the uncured reinforcing material 640 and helps maintain good contact between the uncured reinforcing material 640 with the layers below.

Figure 5:
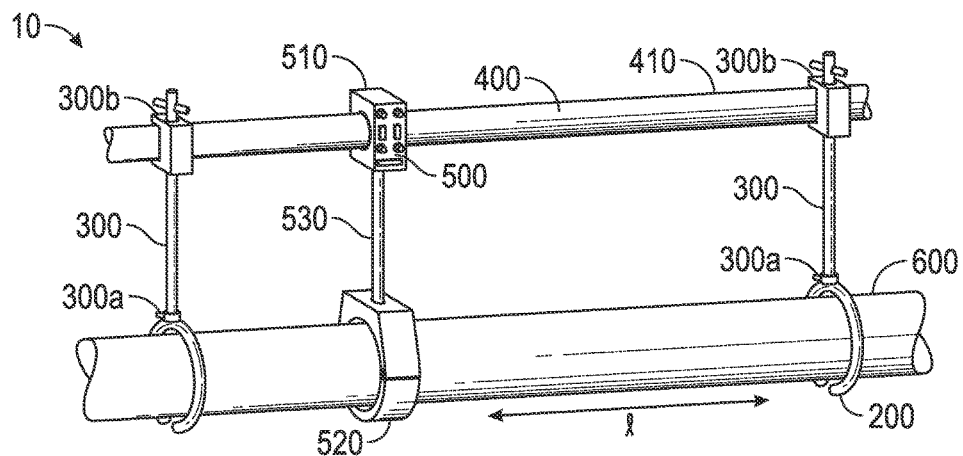
FIGS. 5 and 6 are illustrations of embodiments of a machine for reinforcing a thermoplastic pipe.

Energy is then applied to the uncured reinforcing material 640 to cure the reinforcing material to form a cured reinforcing material 700 (shown in FIG. 5). Energy may be applied by any suitable energy delivery system. In one embodiment, the energy is applied using machine 10 (not shown). The energy delivered is preferable heat, but may also be UV light or any other energy that causes the uncured reinforcing material 640 to cure. In a preferred embodiment, the energy is delivered as heat. The heat may be supplied in any suitable form, preferably hot or heated air such as from a hot air blower. Preferably, the heat is applied until the pipe surface reaches a temperature of at least about 200° F., more preferably at least about 250° F., more preferably at least about 300° F.

If a constructor wrapping was used, then it may be removed after the reinforcing material is cured (or it can be left in place if desired). Preferably, the energy delivery system delivers energy to essentially the entire circumference of a portion of the length of the pipe. The pipe 600 should now be fully repaired and useable. After curing, the machine that delivered the energy is removed.

In one embodiment, the energy delivery system used to supply energy in the form of heat to the film 630 and/or the uncured reinforcing material 640 may be in the form of an energy delivery machine which will now be described.

Referring now to FIG. 5, there is shown one embodiment of the energy delivery machine 10. The machine 10 contains a pair of clamps 200 adapted to attach to a thermoplastic pipe 600 along the thermoplastic pipe length. The clamps 200 may contain pads between the clamps 200 and outer surface of the pipe 600. These pads may help insure a good grip on the pipe and prevent and damage from the clamps to the pipe. The clamp that attaches to the pipe at each end of the device is designed to allow the device to be set onto the pipe in such a way that it encompasses about half the circumference of the pipe, in one embodiment. The upper half of the clamp may be fitted with a suitable durometer, compressible elastomeric material, which grips the pipe but does not damage the pipe at the attachment point. The bottom half of the clamp may also be fitted with a suitable durometer, compressible elastomeric material. In one embodiment, the bottom half of the clamp "swings" up from a double hinge point and attaches to the top half of the clamp in such a way as to not damage the pipe. Once secured, the clamp 200 is firmly attached to the pipe 600. The clamp 200 also serves to keep the heating tool aligned around the pipe to insure even heat is applied to the full circumference of the pipe during operation. The clamp devise is also designed to allow the tool to be mounted not only horizontally along a pipe but also vertically.

The machine 10 also contains at least pair of extenders 300 (in some embodiments, the machine comprises 3 or more extenders). Each extender 300 has a first end 300a and a second end 300b. The first end 300a is connected to the clamp 200 and the extenders extend away from the thermoplastic pipe 600. The extenders 300 are parallel to each other. The extenders 300 serve to connect the clamps 200 with the track system 400. The extenders are typically metal and should be able to support the weight of the track system 400.

A track system 400 extends between the second ends 300b of the extenders 300. The track system may extend from one extender to a second extender or may extend beyond one or more of the extenders 300. The track system 400 comprises at least one generally linear member 410. The generally linear member 410 supports the energy delivery system 500. Preferably, the track system comprises two generally linear members 410. In another embodiment, the track system comprises three or more generally linear members 410. In the embodiments were there are two or more generally linear members 410, the generally linear members 410 are approximately parallel to one another. It is preferable to have two generally linear members 410 as this provides more support for the energy delivery system 500 and helps hold the energy delivery system 500 in the correct plane. The track system is comprised of linear motion components that span the work area. The track is either linear motion rods with suitable stiffness to resist bending over the repair area or a wheeled track, again, designed to resist bending over the repair area.

Figure 6:
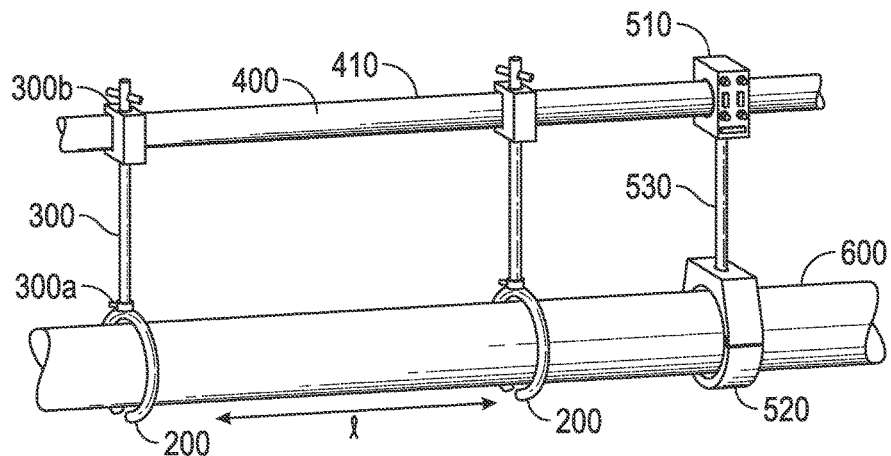

The energy delivery system 500 has a track section 510 attached to the track system, a cure head 520, and a mid-section 530 connecting the track section 510 and the cure head 520. The energy delivery system 500 is moveable along the length of the pipe 600 on the track system 400. The track section 510 of the energy delivery system 500 may use any means that allows for the attachment of the energy delivery system 500 to the track system 400 and movement along the generally linear member 410. In one embodiment, the energy delivery system 500 is located on the track system 400 between the extenders 300 (such as shown in FIG. 5). In another embodiment, the energy delivery system 500 is located on the track system 400 outside of the area between the extenders 300 (such as shown in FIG. 6). In this embodiment, the energy delivery system 500 would be cantilevered. This may be useful for some pipes where it is difficult to place clamps and extenders in certain areas of the pipe due to the environment surrounding the pipe 600.

The track section 510 is used to move the heating device horizontally over the repair area while maintaining the cure head 520 (heat delivery nozzle) centered on the repair area. This delivers even energy (typically in the form of heat energy) to the entire circumference of the pipe.

The cure head 520 comprises a circular attachment adapted to extend around the entire circumference of a portion of the length of the pipe 600 and deliver energy to at least a portion of the pipe 600 at a time. Preferably, the cure head delivers energy to essentially the entire circumference of a portion of the length of the pipe. The energy deliver system moves along the track system to cure the uncured reinforcing material along the length of the pipe.

Preferably, the cure head 520 delivers energy in the form of heat. Preferably, the cure head delivers energy in the form of hot air. The cure head 520 is comprised of a heat delivery element with variable controls for temperature and air flow volume. A preferred heater may be capable of delivering temperatures of between 100° F. and 1100° F. at various air flow volumes (3.5-12.5 cfm). The heat is delivered to the work surface using a nozzle. This nozzle is preferably a split construction which allows for the nozzle to fit around a pipe and clamp shut around that pipe to provide an annular distance of ≈0.5" from the pipe surface. This type of nozzle can distribute heat from any number of heat generating sources.

The machine is designed to be used insitu, attaching to pipes above ground or those exposed by excavation. Its design may be compact enough to allow installation in small tight spaces requiring only 12" or less around a pipe for operation. The machine and process are designed to effect repairs on live pipes, not requiring the gas flow to be interrupted during the repair process.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A machine for reinforcing a thermoplastic pipe, wherein the thermoplastic pipe has an outer surface and a length and at least one defect on the outer surface, wherein the machine comprises:
   a pair of clamps configured to attach to a thermoplastic pipe along the thermoplastic pipe length;
   a pair of extenders having a first end and a second end, wherein the first end is connected to the pair of clamps and the pair of extenders extend away from the thermoplastic pipe, wherein the pair of extenders are parallel to each other;
   a track system extending between the second ends of the pair of extenders, wherein the track system comprises at least one generally linear member;
   an energy delivery system, wherein the energy delivery system comprises a track end attached to the track system, a cure head comprising a circular attachment configured to extend around the entire circumference of a portion of the length of the pipe, a mid-section connecting the track end and the cure head, wherein the energy delivery system is moveable along the length of the pipe on the track system, and wherein the energy delivery system is moveable along the generally linear member of the track system.

2. The machine of claim 1, wherein the pair of clamps comprises pads between the clamps and outer surface of the pipe.

3. The machine of claim 1, wherein the track system comprises at least 2 generally linear members and wherein the generally linear members are generally parallel to each other.

4. The machine of claim 1, wherein the track system extends past at least one of the extenders.

5. The machine of claim 1, wherein the energy delivery system is located on the track system between the pair of extenders.

6. The machine of claim 1, wherein the energy delivery system is located on the track system outside of the area between the pair of extenders.

7. The machine of claim 1, wherein the energy delivery system delivers heat to the circumference of the pipe.

8. The machine of claim 7, wherein the heat is in the form of hot air.

9. The process of claim 7, wherein the energy delivery system delivers heat to the entire circumference of the pipe simultaneously.

* * * * *